United States Patent
Schafer et al.

(10) Patent No.: US 11,461,407 B1
(45) Date of Patent: Oct. 4, 2022

(54) SYSTEM, METHOD, AND COMPUTER PROGRAM PRODUCT FOR TOKENIZING DOCUMENT CITATIONS

(71) Applicant: Clearbrief, Inc., Seattle, WA (US)

(72) Inventors: Jacqueline Grace Schafer, Seattle, WA (US); Jose Demetrio Saura, Seattle, WA (US); Tovi Jordan Newman, Seattle, WA (US); Kristina Marian Hollingshead, Seattle, WA (US)

(73) Assignee: Clearbrief, Inc., Seattle, WA (US)

( * ) Notice: Subject to any disclaimer, the term of this patent is extended or adjusted under 35 U.S.C. 154(b) by 0 days.

(21) Appl. No.: 17/575,834

(22) Filed: Jan. 14, 2022

(51) Int. Cl.
| | |
|---|---|
| *G06F 16/00* | (2019.01) |
| *G06F 16/906* | (2019.01) |
| *G06F 16/93* | (2019.01) |
| *G06F 40/177* | (2020.01) |
| *G06F 40/284* | (2020.01) |
| *G06F 40/134* | (2020.01) |
| *G06F 16/903* | (2019.01) |

(52) U.S. Cl.
CPC ...... *G06F 16/906* (2019.01); *G06F 16/90344* (2019.01); *G06F 16/93* (2019.01); *G06F 40/134* (2020.01); *G06F 40/177* (2020.01); *G06F 40/284* (2020.01)

(58) Field of Classification Search
CPC .. G06F 16/906; G06F 16/93; G06F 16/90344; G06F 40/10; G06F 40/103; G06F 40/134; G06F 40/28; G06F 40/40; G06F 40/177; G06F 40/284
See application file for complete search history.

(56) References Cited

U.S. PATENT DOCUMENTS

| | | | |
|---|---|---|---|
| 6,772,149 B1 * | 8/2004 | Morelock | G06F 16/334 |
| | | | 715/236 |
| 7,003,719 B1 | 2/2006 | Rosenoff et al. | |
| 7,028,259 B1 | 4/2006 | Jacobson | |
| 7,735,010 B2 | 6/2010 | Zhang et al. | |
| 7,778,954 B2 | 8/2010 | Rhoads et al. | |
| 8,201,085 B2 | 6/2012 | Rollins et al. | |
| 8,219,566 B2 * | 7/2012 | Rolle | G06F 40/289 |
| | | | 707/917 |
| 8,713,031 B1 * | 4/2014 | Lee | G06F 40/205 |
| | | | 707/755 |
| 9,177,013 B2 * | 11/2015 | Rollins | G06F 40/205 |

(Continued)

OTHER PUBLICATIONS

Carlson et al., "Learning a Named Entity Tagger from Gazetteers with the Partial Perceptron", 2009 AAAI Spring Sumposium on Learning by Reading and Learning to Read, 2009, 7 pages.

*Primary Examiner* — Leslie Wong
(74) *Attorney, Agent, or Firm* — The Webb Law Firm

(57) ABSTRACT

A method, system, and computer program product is provided for tokenizing document citations. The method may include tokenizing each string of a plurality of strings into at least one citation token representing at least one citation parameter, resulting in a plurality of citation tokens, grouping the plurality of citation tokens into a plurality of token groups, each token group of the plurality of token groups including at least one citation token representing a separate citation in the at least one textual document, assigning metadata to each token group of the plurality of token groups, and generating a normalized citation for each token group of the plurality of token groups based on the metadata.

20 Claims, 11 Drawing Sheets

(56) References Cited

U.S. PATENT DOCUMENTS

| | | | |
|---|---|---|---|
| 9,256,889 B1 | 2/2016 | Yun et al. | |
| 9,760,961 B2 | 9/2017 | Steensgard | |
| 10,002,116 B2* | 6/2018 | Pop-Lazarov | G06F 40/258 |
| 10,146,864 B2* | 12/2018 | Kemp | G06Q 10/10 |
| 10,535,016 B2 | 1/2020 | Johnson et al. | |
| 11,361,151 B1 | 6/2022 | Guberman et al. | |
| 2002/0156760 A1* | 10/2002 | Lawrence | G06F 16/382 |
| 2006/0149720 A1* | 7/2006 | Dehlinger | G06F 16/313 |
| | | | 707/E17.084 |
| 2008/0059435 A1* | 3/2008 | Steensgard | G06F 16/252 |
| 2008/0178077 A1* | 7/2008 | Boucher | G06F 16/382 |
| | | | 715/266 |
| 2009/0043797 A1* | 2/2009 | Dorie | G06F 16/355 |
| | | | 707/999.102 |
| 2009/0112859 A1* | 4/2009 | Dehlinger | G06F 16/382 |
| 2009/0187567 A1 | 7/2009 | Rolle | |
| 2010/0005388 A1* | 1/2010 | Haschart | G06F 16/93 |
| | | | 715/256 |
| 2014/0180935 A1* | 6/2014 | Rhoads | G06F 16/93 |
| | | | 705/311 |
| 2014/0214701 A1* | 7/2014 | Buzzy | G06Q 10/10 |
| | | | 705/311 |
| 2015/0149371 A1* | 5/2015 | Kunzang | G06Q 50/18 |
| | | | 705/311 |
| 2018/0157658 A1 | 6/2018 | Dow et al. | |
| 2021/0065320 A1* | 3/2021 | Bleiweiss | G06F 40/134 |
| 2021/0406290 A1 | 12/2021 | Sharma et al. | |

* cited by examiner

Details for: garcia-becerra-Excerpt_of_Record.pdf

How you cite to this record

ER # e.g. ER #

Bates Stamp?

Bates Stamp Pattern e.g. ER #

First page number

1

"1" unless part of larger document

Number of preliminary pages

3

How many pages before "page 1"?

UPDATE RECORD DETAILS

SYSTEM, METHOD, AND COMPUTER PROGRAM PRODUCT FOR TOKENIZING DOCUMENT CITATIONS

BACKGROUND

1. Field

This disclosure relates generally to processing textual documents and, in non-limiting embodiments or aspects, systems, methods, and computer program products for tokenizing document citations.

2. Technical Considerations

In a textual document of a legal nature, such as a legal brief, it is important to support legal reasoning or factual statements (assertions) with one or more supporting sources. Sources that support a legal reasoning include laws, legal rules and regulations, legal doctrines, or court cases/opinions. Sources that support a factual statement include evidence records, deposition transcripts, publicly available documents (e.g., books, articles, scientific journals, periodic publications, etc.), or electronic documents published on or retrieved from the Internet.

Courts that receive legal briefs specify formatting rules or standards for citing a source. The cited sources are often referred to as an "authority". The "Bluebook: A Uniform System of Citation" is a style guide that prescribes the most widely used legal citation system in the U.S. It is taught and used at a majority of U.S. law schools, and is also used in a majority of federal courts. However, state and local courts each have their own variations and depart from The Bluebook® rules in significant ways, creating challenges for practitioners who risk having their filings rejected or angering the court if they do not adhere to these unique requirements.

Given the large number of rules, and the discrepancies between courts, it is difficult and time-consuming to format citations (also referred to as "cites") according to these standards and to verify compliance with the current standards during proofing of the document prior to filing with a court, or more generally before publishing a textual document. The same problem applies to any form of textual document where citations need to follow certain rules, such as a contract, a scientific publication, an insurance policy claim, a regulatory submission, a legal brief (e.g., a motion, a pleading, a memorandum, a letter, an opinion, etc.). Some solutions have been proposed to address this problem, without resolving it satisfactorily.

When editing a textual document, users may enter citations to sources (e.g., regulation, case law, court record, evidence) to support related assertions. In legal documents, sources can be of two kinds: record documents (supporting factual statements) or legal authorities (supporting legal reasoning). A record document could be cited as "JA5" for Judicial Appendix No. 5 or "R34" for Record No. 34, as examples. A legal authority may refer to information sources that are publicly available, such as cases, statutes, regulations, and websites. Users frequently need to create a table of citations or other indexes based on both of these types of citations.

Several drawbacks may be associated with use of the existing solutions. Some existing solutions provide a specialized text processing application software with field codes for formatting citations. Each field code defines a certain attribute or property and may further include a textual value. Other solutions verify the syntax of each citation and impose a burden to edit citations instead of continuing with the document editing. These existing solutions negatively impact the productivity of users, have limited practical utility, and are only used by expert users ("power-users") who understand formatting conventions and/or specialized field codes. For instance, field-code based solutions may create errors when non-expert users copy-and-paste a paragraph comprising hidden field codes. In addition, citation validation solutions may be frustrating for non-expert users who have to interrupt their document authoring flow to respond to error messages or popup alerts when trying to enter a (presumably malformed) citation. Existing solutions force users into a frustrating and unproductive "editing while writing" authoring workflow. These existing solutions do not permit a more productive "write first, edit later" authoring workflow.

Other solutions enforce style rules in a complicated manner, following a sequential editing workflow for creating, editing, and saving citations. If a textual document is edited and a citation is added or removed, the cardinality of other citations will change, and the formatting rule may be broken. For instance, if a new citation (e.g., regulation, case/opinion, court record, evidence, etc.) is added in the middle of a legal brief in an unstructured way, it is not possible to automatically incorporate this new citation into an existing table of citations. In addition, existing solutions represent changes to the user's original citation data by displaying a message for users, requiring the user to choose from a variety of options that are confusing and time-consuming for the user to sort through.

Other solutions also process citations by using rule-based software engineering methods tied to the Bluebook Rules, which fail to detect errors in situations that do not meet the programmed heuristics. For example, such solutions cannot detect that a text fragment is a citation based on only a fragment of text. Other solutions are limited to identifying and working only with legal citations as opposed to record citations. Other solutions are designed to be used locally on a specific device, limiting the ability to physically work from alternate office locations.

SUMMARY

According to non-limiting embodiments or aspects, provided is a computer-implemented method for processing a textual document, comprising: tokenizing, with the at least one processor, each string of a plurality of strings in at least one textual document into at least one citation token representing at least one citation parameter, resulting in a plurality of citation tokens; grouping, with the at least one processor, the plurality of citation tokens into a plurality of token groups, each token group of the plurality of token groups comprising at least one citation token representing a separate citation in the at least one textual document; assigning, with the at least one processor, metadata to each token group of the plurality of token groups, the metadata comprising a cardinality of the citation represented by each token group; generating, with the at least one processor, a normalized citation for each token group of the plurality of token groups based on the metadata and the at least one citation token of the token group; and generating, with the at least one processor, a document citation data structure based on the normalized citation for each token group of the plurality of token groups.

In non-limiting embodiments or aspects, the method further comprises: matching the normalized citation for each string of the plurality of strings to records of a citation database; and in response to determining that the normalized citation does not match the records of the citation database, adding the normalized citation to the citation database. In non-limiting embodiments or aspects, the method further comprises: matching the normalized citation for each string of the plurality of strings to records of a citation database; and in response to determining that the normalized citation matches a record of the citation database, validating the normalized citation. In non-limiting embodiments or aspects, the method further comprises: associating an external document to at least one normalized citation of the document citation data structure; and inserting a hyperlink to the external document into the at least one normalized citation.

In non-limiting embodiments or aspects, the method further comprises: receiving a plurality of external documents uploaded or linked by a user; and prompting the user to input document data for each external document of the plurality of external documents. In non-limiting embodiments or aspects, the method further comprises: determining a citation category for each normalized citation from a plurality of citation categories; and generating a plurality of tables of citations based on the document citation data structure, a format of the at least one textual document, and the citation category for each normalized citation. In non-limiting embodiments or aspects, the plurality of tables of citations comprises a table of authorities and a table of exhibits.

In non-limiting embodiments or aspects, the method further comprises determining the cardinality for each string of the plurality of strings based at least on a position of the string in a sequence of the plurality of strings and a number of preceding matching citations. In non-limiting embodiments or aspects, the method further comprises: generating a table of citations based on the document citation data structure and a format of the at least one textual document. In non-limiting embodiments or aspects, the method further comprises determining the cardinality of the citation represented by each token group based on at least one of the following: a preceding citation represented by a different token group, a following citation represented by a different token group, or any combination thereof. In non-limiting embodiments or aspects, the method further comprises generating at least one of the following based on the document citation data structure: a table of authorities, a set of reference documents or portions thereof, an index, an exhibit compilation, a table of contents, a word processing native file, or any combination thereof. In non-limiting embodiments or aspects, the method further comprises, before tokenizing, parsing, with at least one processor, the at least one textual document to identify the plurality of strings based on a citation segment tagger algorithm, each string of the plurality of strings representing at least a portion of a citation.

According to non-limiting embodiments or aspects, provided is a system comprising: at least one processor programmed or configured to: tokenize each string of a plurality of strings in at least one textual document into at least one citation token representing at least one citation parameter, resulting in a plurality of citation tokens; group the plurality of citation tokens into a plurality of token groups, each token group of the plurality of token groups comprising at least one citation token representing a separate citation in the at least one textual document; assign metadata to each token group of the plurality of token groups, the metadata comprising a cardinality of the citation represented by each token group; generate a normalized citation for each token group of the plurality of token groups based on the metadata and the at least one citation token of the token group; and generate a document citation data structure based on the normalized citation for each token group of the plurality of token groups.

In non-limiting embodiments or aspects, the at least one processor is further programmed or configured to: match the normalized citation for each string of the plurality of strings to records of a citation database; in response to determining that the normalized citation does not match the records of the citation database, add the normalized citation to the citation database; and in response to determining that the normalized citation matches a record of the citation database, validate the normalized citation. In non-limiting embodiments or aspects, the at least one processor is further programmed or configured to: associate an external document to at least one normalized citation of the document citation data structure; and insert a hyperlink to the external document into the at least one normalized citation. In non-limiting embodiments or aspects, the at least one processor is further programmed or configured to: determine a citation category for each normalized citation from a plurality of citation categories; and generate a plurality of tables of citations based on the document citation data structure, a format of the at least one textual document, and the citation category for each normalized citation.

In non-limiting embodiments or aspects, the at least one processor is further programmed or configured to: generate a table of citations based on the document citation data structure and a format of the at least one textual document. In non-limiting embodiments or aspects, the at least one processor is further programmed or configured to generate at least one of the following based on the document citation data structure: a table of authorities, a set of reference documents or portions thereof, an index, an exhibit compilation, a table of contents, a word processing native file, or any combination thereof. In non-limiting embodiments or aspects, the at least one processor is further programmed or configured to, before tokenizing, parse, with at least one processor, the at least one textual document to identify the plurality of strings based on a citation segment tagger algorithm, each string of the plurality of strings representing at least a portion of a citation.

According to non-limiting embodiments or aspects, provided is a computer program product comprising at least one non-transitory computer-readable medium including program instructions that, when executed by at least one processor, cause the at least one processor to: tokenize each string of a plurality of strings in at least one textual document into at least one citation token representing at least one citation parameter, resulting in a plurality of citation tokens; group the plurality of citation tokens into a plurality of token groups, each token group of the plurality of token groups comprising at least one citation token representing a separate citation in the at least one textual document; assign metadata to each token group of the plurality of token groups, the metadata comprising a cardinality of the citation represented by each token group; generate a normalized citation for each token group of the plurality of token groups based on the metadata and the at least one citation token of the token group; and generate a document citation data structure based on the normalized citation for each token group of the plurality of token groups.

Other non-limiting embodiments or aspects will be set forth in the following numbered clauses:

Clause 1: A computer-implemented method for processing a textual document, comprising: tokenizing, with the at least one processor, each string of a plurality of strings in at least one textual document into at least one citation token representing at least one citation parameter, resulting in a plurality of citation tokens; grouping, with the at least one processor, the plurality of citation tokens into a plurality of token groups, each token group of the plurality of token groups comprising at least one citation token representing a separate citation in the at least one textual document; assigning, with the at least one processor, metadata to each token group of the plurality of token groups, the metadata comprising a cardinality of the citation represented by each token group; generating, with the at least one processor, a normalized citation for each token group of the plurality of token groups based on the metadata and the at least one citation token of the token group; and generating, with the at least one processor, a document citation data structure based on the normalized citation for each token group of the plurality of token groups.

Clause 2: The computer-implemented method of clause 1, further comprising: matching the normalized citation for each string of the plurality of strings to records of a citation database; and in response to determining that the normalized citation does not match the records of the citation database, adding the normalized citation to the citation database.

Clause 3: The computer-implemented method of clauses 1 or 2, further comprising: matching the normalized citation for each string of the plurality of strings to records of a citation database; and in response to determining that the normalized citation matches a record of the citation database, validating the normalized citation.

Clause 4: The computer-implemented method of any of clauses 1-3, further comprising: associating an external document to at least one normalized citation of the document citation data structure; and inserting a hyperlink to the external document into the at least one normalized citation.

Clause 5: The computer-implemented method of any of clauses 1-4, further comprising: receiving a plurality of external documents uploaded or linked by a user; and prompting the user to input document data for each external document of the plurality of external documents.

Clause 6: The computer-implemented method of any of clauses 1-5, further comprising: determining a citation category for each normalized citation from a plurality of citation categories; and generating a plurality of tables of citations based on the document citation data structure, a format of the at least one textual document, and the citation category for each normalized citation.

Clause 7: The computer-implemented method of any of clauses 1-6, wherein the plurality of tables of citations comprises a table of authorities and a table of exhibits.

Clause 8: The computer-implemented method of any of clauses 1-7, further comprising determining the cardinality for each string of the plurality of strings based at least on a position of the string in a sequence of the plurality of strings and a number of preceding matching citations.

Clause 9: The computer-implemented method of any of clauses 1-8, further comprising: generating a table of citations based on the document citation data structure and a format of the at least one textual document.

Clause 10: The computer-implemented method of any of clauses 1-9, further comprising determining the cardinality of the citation represented by each token group based on at least one of the following: a preceding citation represented by a different token group, a following citation represented by a different token group, or any combination thereof.

Clause 11: The computer-implemented method of any of clauses 1-10, further comprising generating at least one of the following based on the document citation data structure: a table of authorities, a set of reference documents or portions thereof, an index, an exhibit compilation, a table of contents, a word processing native file, or any combination thereof.

Clause 12: The computer-implemented method of any of clauses 1-11, further comprising, before tokenizing, parsing, with at least one processor, the at least one textual document to identify the plurality of strings based on a citation segment tagger algorithm, each string of the plurality of strings representing at least a portion of a citation.

Clause 13: A system comprising: at least one processor programmed or configured to: tokenize each string of a plurality of strings in at least one textual document into at least one citation token representing at least one citation parameter, resulting in a plurality of citation tokens; group the plurality of citation tokens into a plurality of token groups, each token group of the plurality of token groups comprising at least one citation token representing a separate citation in the at least one textual document; assign metadata to each token group of the plurality of token groups, the metadata comprising a cardinality of the citation represented by each token group; generate a normalized citation for each token group of the plurality of token groups based on the metadata and the at least one citation token of the token group; and generate a document citation data structure based on the normalized citation for each token group of the plurality of token groups.

Clause 14: The system of clause 13, the at least one processor is further programmed or configured to: match the normalized citation for each string of the plurality of strings to records of a citation database; in response to determining that the normalized citation does not match the records of the citation database, add the normalized citation to the citation database; and in response to determining that the normalized citation matches a record of the citation database, validate the normalized citation.

Clause 15: The system of clauses 13 or 14, the at least one processor is further programmed or configured to: associate an external document to at least one normalized citation of the document citation data structure; and insert a hyperlink to the external document into the at least one normalized citation.

Clause 16: The system of any of clauses 13-15, the at least one processor is further programmed or configured to: determine a citation category for each normalized citation from a plurality of citation categories; and generate a plurality of tables of citations based on the document citation data structure, a format of the at least one textual document, and the citation category for each normalized citation.

Clause 17: The system of any of clauses 13-16, the at least one processor is further programmed or configured to: generate a table of citations based on the document citation data structure and a format of the at least one textual document.

Clause 18: The system of any of clauses 13-17, the at least one processor is further programmed or configured to generate at least one of the following based on the document citation data structure: a table of authorities, a set of reference documents or portions thereof, an index, an exhibit compilation, a table of contents, a word processing native file, or any combination thereof.

Clause 19: The system of any of clauses 13-18, the at least one processor is further programmed or configured to, before tokenizing, parse, with at least one processor, the at least one textual document to identify the plurality of strings based on a citation segment tagger algorithm, each string of the plurality of strings representing at least a portion of a citation.

Clause 20: A computer program product comprising at least one non-transitory computer-readable medium including program instructions that, when executed by at least one processor, cause the at least one processor to: tokenize each string of a plurality of strings in at least one textual document into at least one citation token representing at least one citation parameter, resulting in a plurality of citation tokens; group the plurality of citation tokens into a plurality of token groups, each token group of the plurality of token groups comprising at least one citation token representing a separate citation in the at least one textual document; assign metadata to each token group of the plurality of token groups, the metadata comprising a cardinality of the citation represented by each token group; generate a normalized citation for each token group of the plurality of token groups based on the metadata and the at least one citation token of the token group; and generate a document citation data structure based on the normalized citation for each token group of the plurality of token groups.

Clause 21: The computer program product of clause 20, wherein the program instructions further cause the at least one processor to perform the methods of any of clauses 2-12.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 3B is a graphical user interface (GUI) according to some non-limiting embodiments or aspects;

FIG. 4 is a graphical user interface (GUI) according to some non-limiting embodiments or aspects;

DESCRIPTION OF THE PREFERRED EMBODIMENTS

Figure 1:
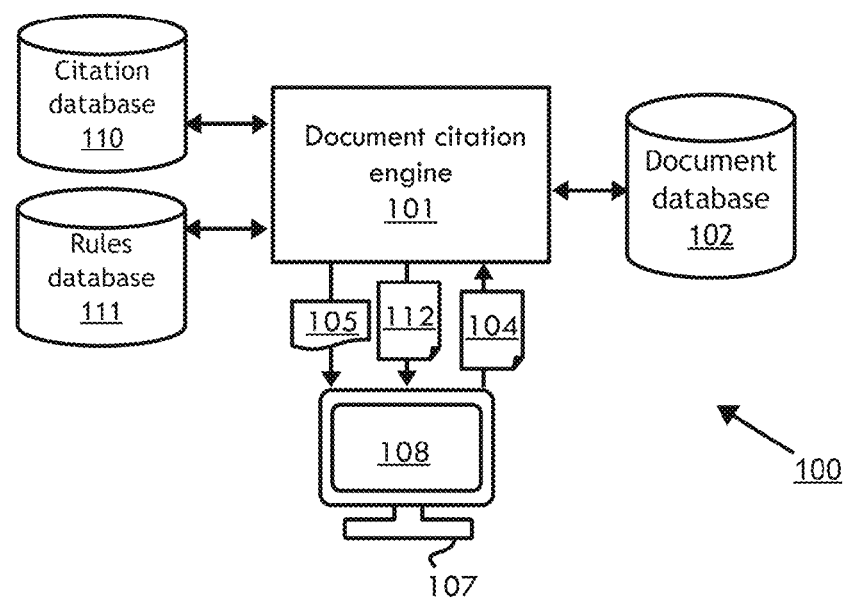
FIG. 1 is a schematic diagram of a system for tokenizing document citations according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Due to the constraints with existing systems, there is a need for a technical solution to automatically update all citations in a document that is edited in a free-text word processing system without the need to enter field codes or otherwise provide user input to select a citation format from a list of identified Bluebook rule-based errors. In addition, there is a need for automatically preparing a table of citations, table of authorities, index of cited record documents, index of secondary sources, table of cited contents, and/or compilation of cited documents with minimal manual oversight or input by a user.

Non-limiting embodiments described herein provide for a system and method for tokenizing document citations that reduces the amount of computational resources associated with post-processing a textual document and/or having an additional user perform complicated editing tasks, such as entering field codes. Moreover, non-limiting embodiments described herein provide for a system to be implemented as an add-in to an existing word processing system, allowing for enhanced functionality from within a single application and avoiding the need for a user to manage multiple software applications during editing. Non-limiting embodiments provide for an interactive graphical user interface (GUI) to facilitate user review of a textual document from within a word processing system. Non-limiting embodiments also provide for an interactive published textual document that incorporates tokenized citations in a way that permits a user to interact with tables and citations within the text.

Referring now to FIG. 1, a system 100 for tokenizing document citations is shown according to non-limiting embodiments. The system includes a document citation engine 101, which may include one or more computing devices and/or software applications executed by one or more computing devices. In non-limiting embodiments, the document citation engine 101 may be executed by a client computing device 107. Additionally or alternatively, the document citation engine may be executed by one or more servers in communication with the client computing device 107. For example, the document citation engine 101 may be one or more client-side applications, one or more server-side applications, or a combination of client-side and server-side applications. In some non-limiting embodiments, the document citation engine 101 may be at least partially integrated with a word processing system, which may include a word processing application such as Microsoft® Word, Google® Documents, or the like. For example, the document citation engine 101 may include a plug-in or an add-in a word processing application that can be accessed from within the existing word processing application (e.g., through a toolbar, sidebar, popup window, and/or the like).

The document citation engine 101 is in communication with a document database 102 which may be local or remote to the document citation engine 101. The document database 102 may include one or more databases arranged on one or more data storage devices in various locations. In non-limiting embodiments, the document database 102 includes legal documents (e.g., briefs, pleadings, and other writings) and/or factual documents (e.g., deposition transcripts, exhibits, and/or other evidentiary documents). It will be appreciated that various document databases may be in communication with the document citation engine 101. For example, a public and/or private document database (not shown in FIG. 1) may include court databases, legal authority databases, information resources, and/or the like, and may be accessed via one or more Application Program Interfaces (APIs) allowing the document database(s) to be queried over a network connection (e.g., over the Internet).

With continued reference to FIG. 1, the document citation engine 101 is in communication with a citation database 110 which may be local or remote to the document citation engine 101. The citation database 110 may include one or more databases arranged on one or more data storage devices in various locations. The citation database 110 stores a library of citations and/or citation formats. The citation database 110 may include, for example, a citation database specific to the inputted textual document and/or related case, and/or a global citation database including numerous known citations from multiple sources. For example, a token-level citation database may include an entry for each specific citation token parsed from the document.

The document citation engine 101 may also be in communication with a rules database 111 which may be local or remote to the document citation engine 100. The rules database 111 may include one or more databases arranged on one or more data storage devices in various locations. The rules database 111 stores rules about citation formats, such as for example Bluebook rules. In some non-limiting examples, the rules in the rules database 111 may be at least partially formed based on the citations in the citation database 110 by learning the formats of accepted and/or approved citations from the citation database 110 through one or more machine-learning processes. The rules database 111 may also be a third-party database accessed remotely via, for example, an API. In some examples, users may input and configure the citation rules. In some examples, the rules database 111 may include local rules, chamber rules, federal rules, state rules, and/or various other rules that may be applicable to a case such that the document citation engine 101 can identify the applicable rules based on an inputted textual document 104 and/or a document in a document database 102 (e.g., a pleading that identifies the venue of the proceeding).

With continued reference to FIG. 1, a textual document 104 is uploaded from a client computing device 107 to the document citation engine 101. In some examples, the textual document 104 may be provided from the document database 102, a cloud-based text or document editing service (e.g., Google Documents, etc.), and/or another source.

Figure 2:
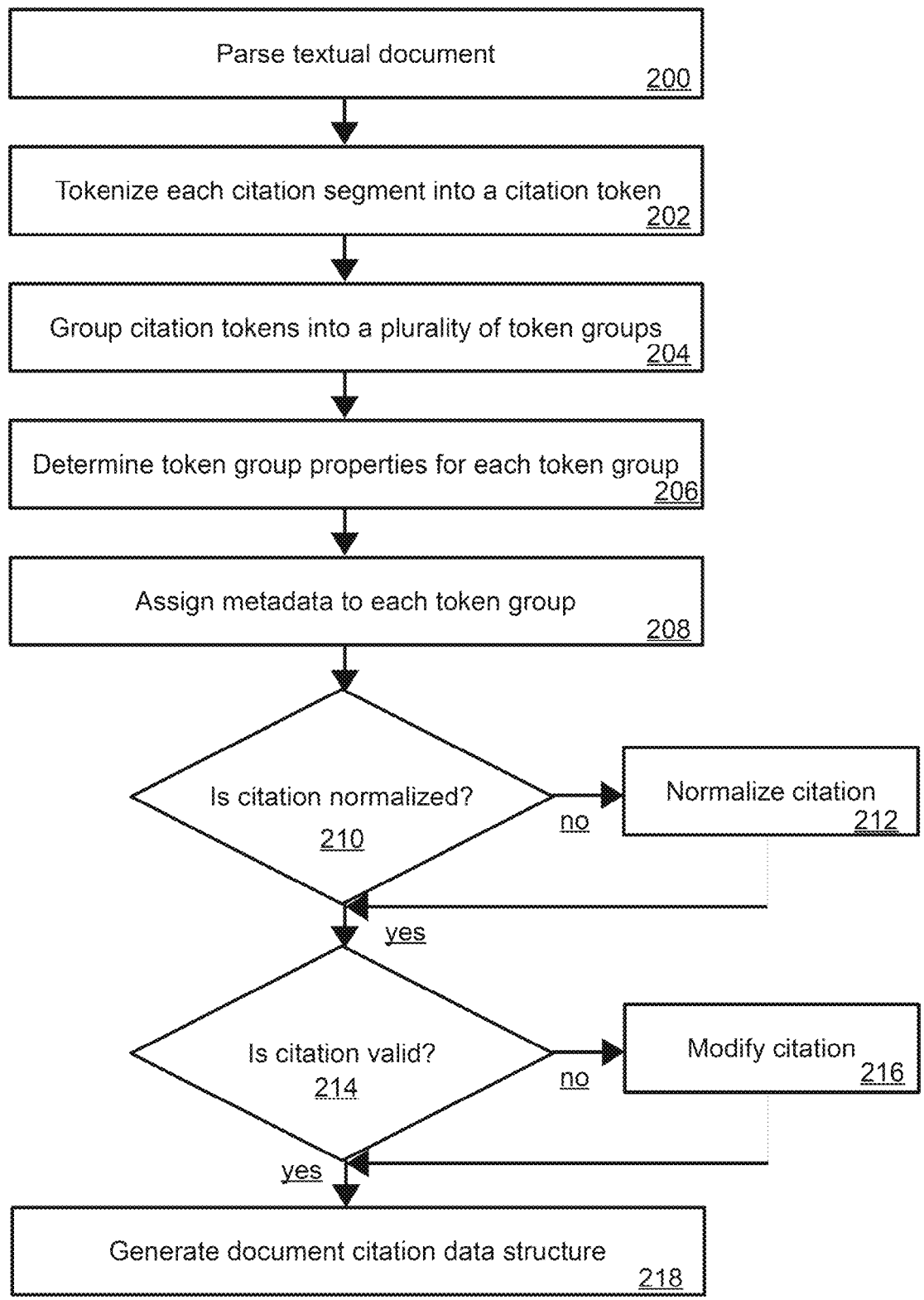
FIG. 2 is a flow chart of a method for tokenizing document citations according to some non-limiting embodiments or aspects.

Referring now to FIG. 2, a flow diagram for a method of tokenizing citations is shown according to non-limiting embodiments. The steps shown in FIG. 2 are for example purposes only, and it will be appreciated that additional, fewer, different, and/or a different order of steps may be used. At step 200, a textual document is parsed. For example, and with continued reference to FIG. 1, the document citation engine 101 receives the textual document and parses it to identify a plurality of strings based on a citation segment tagger algorithm. The citation segment tagger algorithm may be configured like a parts-of-speech tagging algorithm except that it is trained to tag (e.g., identify and/or label) citation segments with specific citation parameters rather than parts of speech. For example, the document citation engine 101 may parse the textual document to identify each citation segment (e.g., a portion of a citation that represents one or more parameters of the citation). A citation segment (e.g., one or more characters in a string) may correspond to a citation parameter (e.g., a tag) that may include, for example, a reporter (e.g.,35 *F.2d,* 12*F.* 3*d*,etc.), a page cite (e.g., 250), a pinpoint cite (e.g., 267-68), a case caption or case name (e.g., U.S. vs. Smith), a party (e.g., Smith), a company or entity name (e.g., Company A), a court (e.g., W.D. Pa), a year (e.g., 2010), a date (e.g., Mar. 1, 2021), and/or the like. A citation segment may also include document or evidentiary citations, such as an appendix number, Bates number or range, title, and/or the like. The document citation engine 101, executing the citation segment tagger algorithm, may parse the document 104 with rule-based methods and/or non-rule based methods that recognize a syntax fragment and variations, and compare the fragment to a dictionary of all possible citations (e.g., such as citations in the citation database 110) using statistical and machine learning techniques.

At step 202 of FIG. 2, the document citation engine 101 tokenizes each of the individual strings (e.g., citation segments) to form a citation token that represents a citation parameter (e.g., individual citation segment). For example, the citation "*Testa* v. *Janssen*, 492 *F. Supp.* 198 (W.D. Pa. 1980)" may be represented by a first citation token for the caption ("*Testa* v. *Janssen*") (or two separate citation tokens for each party), a second citation token for the reporter ("492 F. Supp."), a third citation token for the page cite ("198"), a fourth citation token for the court ("W.D. Pa."), and a fifth citation token for the year ("1980"). In some examples, one or more of the above-mentioned tokens may be combined into a single token, such as the second citation token and third citation token, and the fourth citation token and fifth citation token.

Still referring to FIG. 2, at step 204 the document citation engine 101 groups the citation tokens into token groups, where each token group represents a single, separate citation. Each token group may include one or more citation tokens. For example, the citation tokens that represent the citation "*Testa* v. *Janssen*, 492 *F. Supp.* 198 (W.D. Pa. 1980)" may be grouped together. The grouping of tokens may be stored temporarily in memory or may be stored in the citation database 110. A token group may correspond to a single citation and be represented by one or more citation tokens. The citation tokens may be grouped by proximity and/or one or more clustering algorithms, as an example. In some non-limiting embodiments, a rule-based and/or model-based algorithm may be applied to recognize a particular sequence of citation parameters corresponding to citation tokens (e.g., [case caption] [reporter] [year] or [entity name] "x" [person name] "," [reporter], etc.). Delimiters such as commas, semi-colons, and/or the like may be separate citation tokens, may be part of adjacent citation tokens, or may not be tokenized and be used to recognize sequences of citation tokens.

At step 206 of FIG. 2, token group properties (e.g., citation properties) may be determined for each token group. This may include, for example, determining a cardinality of the citation in the context of the textual document 104, determining a classification or category of the citation, and/or determining and/or identifying other like citation properties. The citation properties may be determined in various ways. For example, the cardinality of the citation may be determined based on a position of the token group in the textual document relative to other token groups with a matching citation. Citations may match even though they are not identical, based on matching long form citations to short form citations, and on matching short form citations to other short form citations (e.g., including "Id." signals).

The cardinality of a citation may be represented in metadata as an occurrence count within the textual document. For example, the cardinality may be one (1) when a source is cited for the first time, two (2) when the same source is cited a second time in the same textual document, three (3) when the same source is cited a third time, and the like. The citation rules may be based on cardinality. For instance, the Bluebook rules for formatting citations specify different citation formats based on its cardinality in a legal document. The first time a source is cited (e.g., a rule triggered by cardinality equaling "1"), the citation is non-abbreviated (e.g., a full citation). The second time (e.g., cardinality is "2"), the citation is abbreviated as "Id." (meaning "Idem"). For example, a citation of the case "*United States* v. *Martinez-Fuerte,* 428 U.S. 543, 545(1976)", where 543 and 545 represent page numbers, would be abbreviated "Id." the second time this source is cited and page 545 is referenced. It is also possible for the citation rules to specify an abbreviated form for when a different page of the source is cited, such as "Id. at 544" to cite page 544 of the same source. When the same source is cited a third time and later, it may be abbreviated with "Iqbal" instead of "Id." based on the citation rules. In non-limiting embodiments, there are syntactical citation rules for abbreviating citations when the same source is cited or when similar sources are cited. The similarity may be limited to an author's name in some instances. For example, an academic citation such as: "MacGillivray, J. A. Minotaur: Sir Arthur Evans and the Archaeology of the Minoan Myth. New York: Hill & Wang, 2000" could be abbreviated as: "Id." if the same source is cited in the sentence following the original citation. In the second citation, "Id." indicates that the source is identical to that of the previous citation. When a user edits a textual document with a word processing system, when a citation is added or removed, the cardinality of other citations may change, and the formatting rule may be broken. Thus, the cardinality of citations represented by token groups can be continually and/or periodically determined as the textual document is edited 104.

With continued reference to step 206 of FIG. 2, in non-limiting embodiments, the document citation engine 101 and/or computing device 107 may automatically determine a citation category from multiple different citation categories to be included in the metadata for a citation. Citation categories may include, for example, legal authority, record evidence, secondary authority, pleading, and/or the like. In some examples, citation categories may be more specific and/or include subcategories, such as but not limited to cases, Constitution, State Constitution, Federal Statutes, Federal Codes, Statute, code/regulation, session laws, state statutes, legislative material, administrative materials, Code of Federal Regulations, Federal Register, books, periodic materials (e.g., newspapers), court and litigation, documents, the Internet, and/or the like. Citation categories may be determined automatically based on a model, classification algorithm, and/or existing categorized citations in the citation database 110. Citation categories may be indicated by metadata for a normalized citation and/or associated token group.

In non-limiting embodiments, each citation category and/or subcategory corresponds with at least one citation rule. For example, a citation category may be associated with citation rules that reflect a defined citation structure having elements that correspond to each citation token. As an example, a citation and/or document classified as "court and litigation," "court order," or the like, may read as "Order 2-5, Jul. 10, 2015, ECF No. 97." This citation includes several citation tokens that may be defined in the citation rules for such citations, which may be represented by the following structure: [Title N1-N2, MMMM, DD, YYYY, Name]. In this example, there are two entity token elements: Title ("Order") and Name ("ECF No. 97"), and five value token elements: N1 ("2," the first page number), N2 ("5," the last page number), MMMM ("July"), DD ("10"), and YYYY ("2015"). In addition to a structure of citation tokens, a citation rule may also specify a set of required elements for different citation parameters, such as a document name, pinpoint citation, and date of the document, as well as one or more optional elements for different citation parameters such as Electronic Case Filing (ECF) number if available.

Still referring to FIG. 2, at step 208, the document citation engine 101, after grouping the citation tokens into multiple token groups and determining citation properties, may assign metadata to each token group of the plurality of token groups. The metadata may include the citation properties determined at step 206. Assigning metadata may include storing the metadata in a citation database.

Once all of the token groups are formed and metadata for each is generated and assigned, the document citation engine 101 may then determine at step 210 whether each citation is normalized. As used herein, the term "normalized citation" refers to a citation that is formatted according to one or more rules, one or more models, and/or is based on existing citations (e.g., from a citation database 110). For example, the document citation engine 101 may determine if adjustments to one or more of the citation tokens and/or token groups are needed to satisfy the citation rules in the rules database 111. If a citation is not normalized, the method may proceed to step 212 and the citation may be normalized by making edits based on the citation rules. In non-limiting embodiments, the citations may be normalized based on citation rules that include local and non-standard citation requirements, beyond general rules (e.g., Bluebook-type rules), as indicated by statistical patterns, source documents, and/or other documents in a case or related case. In non-limiting embodiments, citation rules may include, for example, rules for abbreviations, formatting conventions, and/or the like, and such rules may depend upon citation categories, document type, and/or the like. These rules may be inferred by processing an existing document that is known to be in the desired format.

Still referring to FIG. 2, at step 214, the document citation engine 101 may determine if each citation is valid. For example, each citation may be checked against a source document to determine if a quotation or assertion is supported by the cited document and/or pages. As another example, each citation may also be checked for internal consistency, for example, whether an out-of-range page is cited for a reporter or if multiple citations to the same source document differ. If the citation is not valid, the method may proceed to step 216 and the citation may be modified and/or one or more suggestions for modification may be presented to the user. For example, a page citation may be modified to match a quotation in the textual document. Additionally or alternatively, the citations may be validated after a document citation data structure is generated (e.g., after step 218).

At step 218 of FIG. 2, the document citation engine 101 generates and outputs one or more document citation data structures 105, each of which includes tokenized representations of each normalized, valid citation. The document citation data structure(s) 105 output by the document citation engine 101 may also be received by the citation database 110. In this manner, the citation database 110 may store the document citation data structure(s) to be used in future iterations, to train a machine-learning model, and/or the like.

In non-limiting embodiments, the document citation engine 101 matches each normalized citation to records in the citation database 110 to determine if the normalized citation already exists and, in response to determining that the citation is not in the citation database 110, adds the normalized citation to the citation database 110. If the normalized citation already exists in the citation database 110, the normalized citation may be validated by the document citation engine 101. For example, the normalized citation may be validated by being associated with an indicator (e.g., a flag, a value, and/or the like) that can be programmatically recognized and/or viewed by a user.

Referring back to FIG. 1, the document citation engine 101 may associate one or more documents (other than the textual document 104) with one or more normalized citations. This association may occur after the document citation data structure is generated or, in other examples, during the normalization and/or processing of each citation. For example, one or more court opinions, evidentiary documents, pleadings, secondary authorities (e.g., articles or publications), and/or the like may be associated with a normalized citation. One or more of the associated document(s) may be stored in the document database 102 or on a third-party system. Associating the document with the citation may include inserting a hyperlink or other type of pointer into the normalized citation. A link and/or network location may be part of the metadata in some examples. Citations may be coded with a link automatically without requiring user input. In some examples, through the word processing system and/or a viewing application, a user may visually inspect or read a source document that is associated with each citation by selecting the citation in the document and/or in a table of citations.

The document database 102 may be populated with documents uploaded or identified (e.g., linked) by a user using a GUI 108 on the computing device 107. In some examples, the document citation engine 101 may prompt the user of the client computing device 107, through the GUI 108 and in response to uploading or linking the documents, to input document data for each document. Document data may include, for example, Bates numbers, titles, categories, file type, case number, citation rules, and/or the like. Document data may, in some examples, identify a set of rules from a rules database 111 or another source. In some non-limiting embodiments, a set of documents uploaded to the document database 102 for a target textual document may be automatically compiled and labeled (e.g., paginated, Bates stamped, inserted headers and/or footers with a case caption, and/or the like).

In non-limiting embodiments, the documentation engine 101 and/or computing device 107 may generate one or more tables based on the set of normalized citations for the textual document 104. The one or more tables may be generated automatically or in response to user input. The one or more tables may be based on the document citation data structure, a format of the inputted textual document 104, and/or the citation category for each normalized citation. As an example, a table of authorities and/or a table of exhibits may be generated. In the table of authorities, the normalized citations may be presented according to the metadata for each citation, such that citations for each citation categories are listed together (e.g., legal authority, secondary authority, rules of civil procedure, rules of evidence, case record, and/or the like). The page numbers on which the citations are found and the cardinality of the citations may be part of the metadata used to generate a table. For example, in some examples only the first citation, in long citation form, may be listed in the table of authorities, and subsequent short citations may be indicated with page numbers or "passim" in instances where the citation appears frequently. The tables may be generated based on the format of the textual document 104, as determined from analyzing the textual document and/or from document metadata, including font style, paragraph style, and/or the like.

In non-limiting embodiments, the document citation engine 101 may generate and output a final textual document 112 (e.g., a published textual document). For example, the textual document with normalized citations and embedded metadata may be saved or exported for publishing in its original format and/or in one or more specified formats. In some examples, a citation data structure may be embedded into a native or non-native word processing file, may accompany a word processing file, and/or may be linked to a word processing file. The final textual document 112 may be output to the client computing device 107, document database 110, and/or any other system (e.g., an electronic filing system, a docket management system, and/or the like).

In non-limiting embodiments, the citations in the textual document and/or citations in any tables within the document or part of separate files may include hyperlinks to a document database 102 and/or one or more third-party databases. For example, the links may be embedded as hyperlinks in a Word, PDF, and/or HTML file, and may point to internal and/or external resources. In some examples, the links may be permalinks that do not change even when the source document is changed, such that the links in the published, final document 112 remain valid. The links may be URLs pointing to a document database 102 and/or a set of documents with the source materials accessible in a read-only mode. A table of citations in the published document may also include internal links that point to portions of the textual document in which the citation appears.

In non-limiting embodiments, a final textual document 112 may be an interactive document that can be viewed with a viewing module of an application (e.g., of a word processing system) and/or directly with a word processing application or existing viewing application (e.g., PDF reader, web browser, and/or the like). The user may interact with the final document to navigate or preview an indicated location(s) of the citation in context. For instance, the user may select a dynamic zone (e.g., a line of the table of authorities and/or a page number designated as a selectable region) of the table of authorities to navigate directly to the page of the published document that mentions that particular citation. Additionally or alternatively, the user may preview the citation in context in a pop-up window, a tool-tip window, and/or in a side panel, as examples.

In non-limiting embodiments, the user may interact with the published document 112 by selecting any legal citation in a table of citations to navigate to and/or preview the content of the source document being cited. For example, upon hovering over or selecting a citation, the word processing system and/or viewing application may display a document from a set of source documents from the document database 102 and/or may display a document from a third-party database by generating an API query or following a hyperlink to a third-party network resource. In non-limiting embodiments, a user may select a particular citation, a group of citations, or all of the citations to perform an action on the selected citation(s) in batch, such as printing and/or saving the source document(s) cited by the selected citations. If the user selects multiple citations, or if a citation cites more than one source document, the cited source documents may be combined into a single file, such as a combined PDF file, a compressed (e.g., ZIP) file, and/or the like. In non-limiting embodiments, the combined file may include the cited source document in the order in which the legal citation appears in the table of authorities.

In non-limiting embodiments, different documents may be generated based on the document citation data structure 105. For example, based on the references cited in the document citation data structure 105, the document citation engine 101 and/or computing device 107 may generate a set of documents from the document database 102 (e.g., a subset of documents) and/or may combine or compile a set of documents. The set of documents may be truncated in some examples to only show a portion based on a page cite or the like. The document citation data structure 105 may also be used to generate an index, an exhibit compilation, and/or the like, and such documents may be generated in different formats (e.g., a word processing application native file, a PDF, rich text, HTML, and/or the like).

Figure 3A:
FIG. 3A is a graphical user interface (GUI) according to some non-limiting embodiments or aspects.

Referring now to FIG. 3A, a GUI 300 is shown according to non-limiting embodiments. In some examples, the GUI 300 may be displayed as part of a window in a word processing system, such as in a pop-up window, tab, frame, and/or the like. The GUI 300 may also be displayed in a dedicated application, a web browser, and/or the like. The GUI 300 may be configured to receive documents from a user, such as by receiving uploads of documents or links to documents. In the example shown in FIG. 3A, the GUI 300 receives information from the user about how different documents should be cited based on category ("R. at #" to refer to part of the case record, "Jones Dep. #:#" to refer to a deposition transcript, "ER #" to refer to an excerpt of the record, and the like). A user may input delimiters or symbols (e.g., "#") to represent dynamic parts of the citation that will be populated by the document citation engine 101 and/or used to verify the citations. In some examples, user input or existing citation rules may specify a long and short form of a citation, where a first instance of a citation may use a long form (e.g., "Judicial Appendix No." or "Record No.") and subsequent instances may use a short form (e.g., "JA" or "R"). The GUI 300 also includes selectable options to Bates stamp the document (e.g., number the documents in a case record format). It will be appreciated that various document data may be input into the GUI 300 by the user, and that various selectable options may be presented to facilitate such input. The document data received through the GUI 300 may be used to generate one or more citation rules that are stored in the rules database 111. In some examples, the GUI 300 may facilitate user selection of citation rules to apply from a plurality of possible rules. It will be appreciated that citation rules may be obtained by the system in various ways.

Referring now to FIG. 3B, a GUI 302 is shown according to non-limiting embodiments. In some examples, GUI 302 may be displayed as part of a window in a word processing system, such as in a pop-up window, tab, frame, and/or the like. The GUI 302 may also be displayed in a dedicated application, a web browser, and/or the like. The GUI 302 may be configured to receive user input regarding a specific document, which may allow for additional information and parameters to be set by a user for a document. In the displayed example, the user may specify how a document is cited ("ER #"), how it is paginated, and how it should be Bates stamped, as examples.

Figure 4:
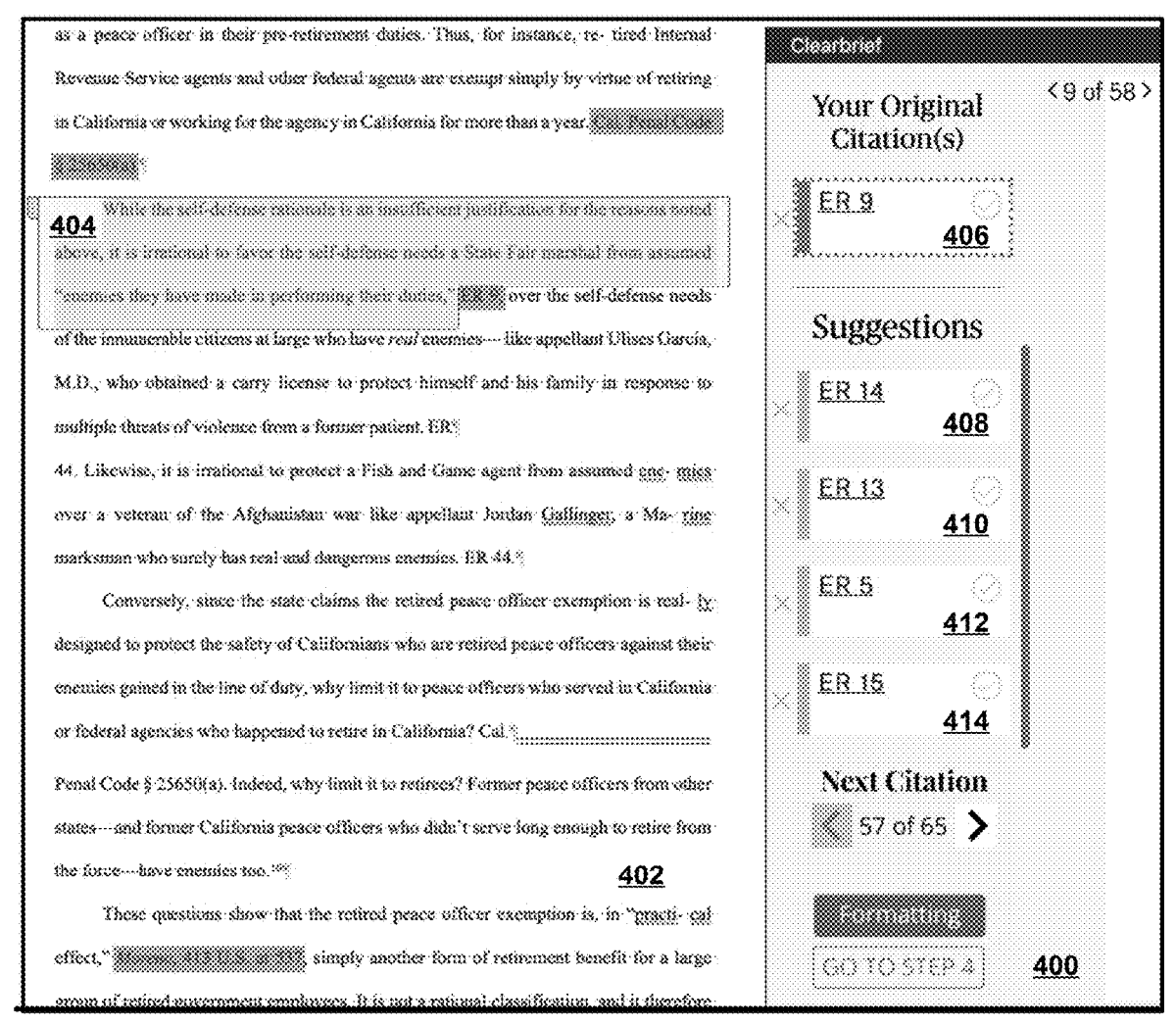

Referring now to FIG. 4, a GUI 400 is shown according to non-limiting embodiments. In the depicted examples, the GUI 400 is displayed as part of a window in a word processing system 402. It will be appreciated that the GUI 400 may also be displayed as a pop-up window, tab, and/or the like. The GUI 400 may also be displayed in a dedicated application, a web browser, and/or the like. The GUI 400 may check citations in the textual document displayed in the word processing system 402, such as comparing quotations, assertions, and context with the source document (e.g., stored in a document database or available through a repository). Individual citations 406-414 may be displayed for viewing with an indication (e.g., such as a color code) of confidence. Each citation may be mapped to the actual citation in the displayed document such that selecting citation 406 may cause a portion 404 of the document to be highlighted that is supported by the citation (e.g., the preceding sentence). An indication may indicate high confidence that the citation is correct (e.g., green), medium confidence that the citation is correct (e.g., yellow), or low confidence that the citation is correct (e.g., red), and may additionally or alternatively include a suggested edit to improve the confidence. Confidence scores may be determined as an output to a citation verification process, such as an output of a model. A user may scroll through the different citations using one or more selectable options. In non-limiting embodiments, a user may select a formatting mode in which the user can review alternate formatting suggestions for any specific citations. Using the GUI 400, a user may step through all of the citations in a document to accept, reject, and/or change suggestions presented to the user.

Figure 5:
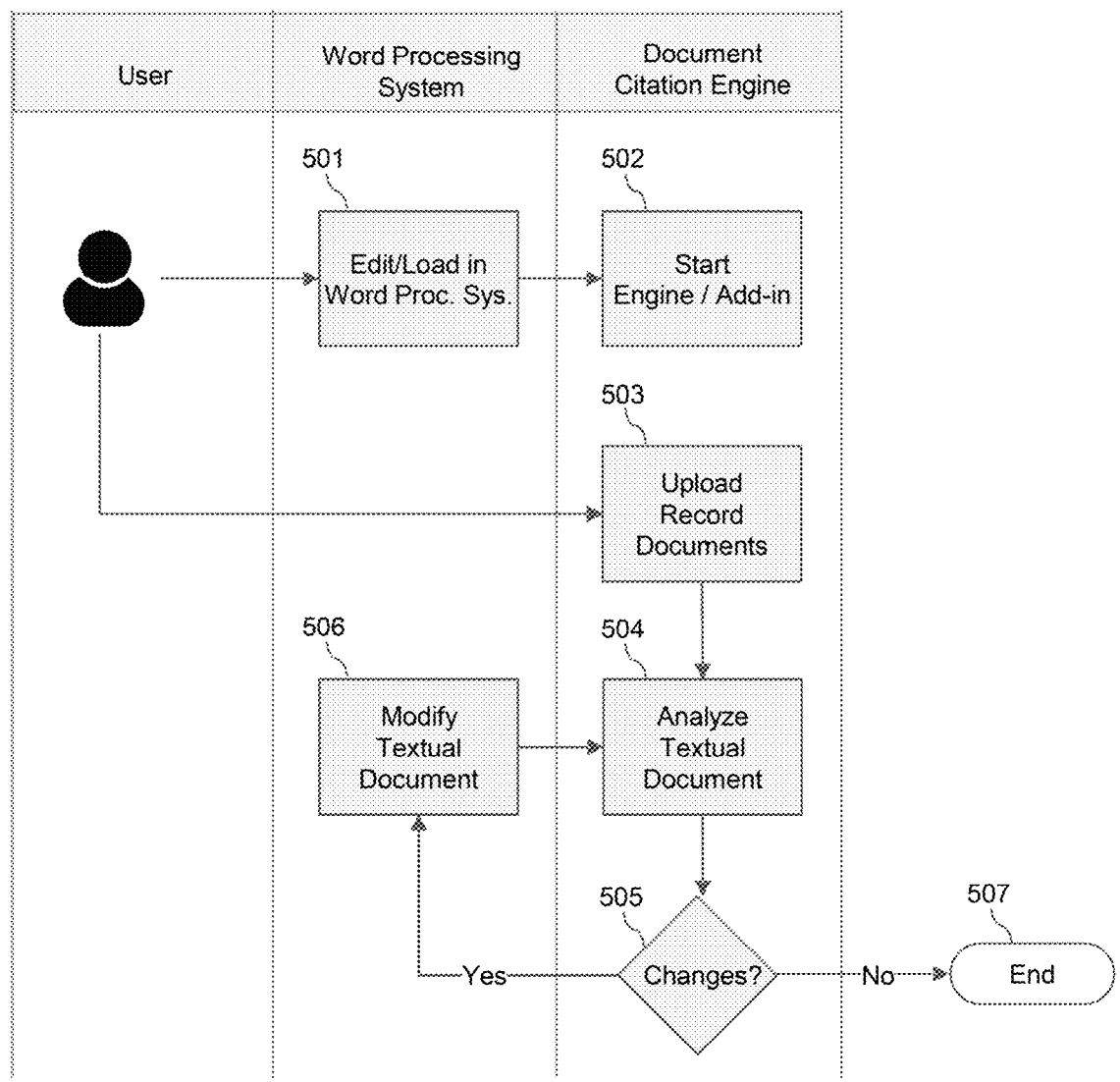
FIG. 5 is a sequence diagram for a method of tokenizing document citations according to some non-limiting embodiments or aspects.

Referring now to FIG. 5, a sequence diagram is shown for editing a legal brief or other document according to non-limiting embodiments. The depicted example illustrates a non-limiting embodiment in which the document citation engine interacts with a word processing system, such as Microsoft® Word, as an add-in (e.g., a plug-in or module that integrates with an existing application) and/or other like software module. A user may start creating and/or editing a textual document (e.g., a legal brief) with the word processing system. When the user is ready to audit the citations of the document, the user may upload the document through the add-in installed in the word processing system. Additionally or alternatively, the user may drag the newly created document into an upload box of a web application. The web application may be accessed via an Internet browser window or via an installed application running locally on a client computing device and connected to the Internet.

With continued reference to FIG. 5, in a first step 501, the user may create a textual document. The user may be an author or an editor of the document. For example, the user may create, edit, or load a legal brief document in the word processing system. In a second step 502, the user may activate a software add-in (e.g., the document citation engine) to perform functionalities that are not built-in to the word processing system. In another step 503, the user may use the document citation engine add-in to upload record documents that are related to the legal brief document. In another step 504, the user may use the add-in to perform an automated analysis of the legal brief document. The user may determine at step 505 if changes to the legal brief document (e.g., text and/or citations) are needed or desired. The document citation engine may also modify some citations automatically (e.g., syntax corrections). If the user determines that changes are needed, the user may modify the document at step 506 without accounting for any complex formatting of citations (e.g., no field codes or syntax rules to follow). The legal brief document may remain an easy to edit unstructured or partially structured file. The user may trigger the automated analysis 504 through user input (e.g., selecting an option), or the automated analysis may be automatically triggered without user action (e.g., when the legal brief document is saved or periodically during the editing). If the user determines that no changes are needed, the user may finalize the legal brief document and publish it along with accompanying cited records at step 507.

Figure 6:
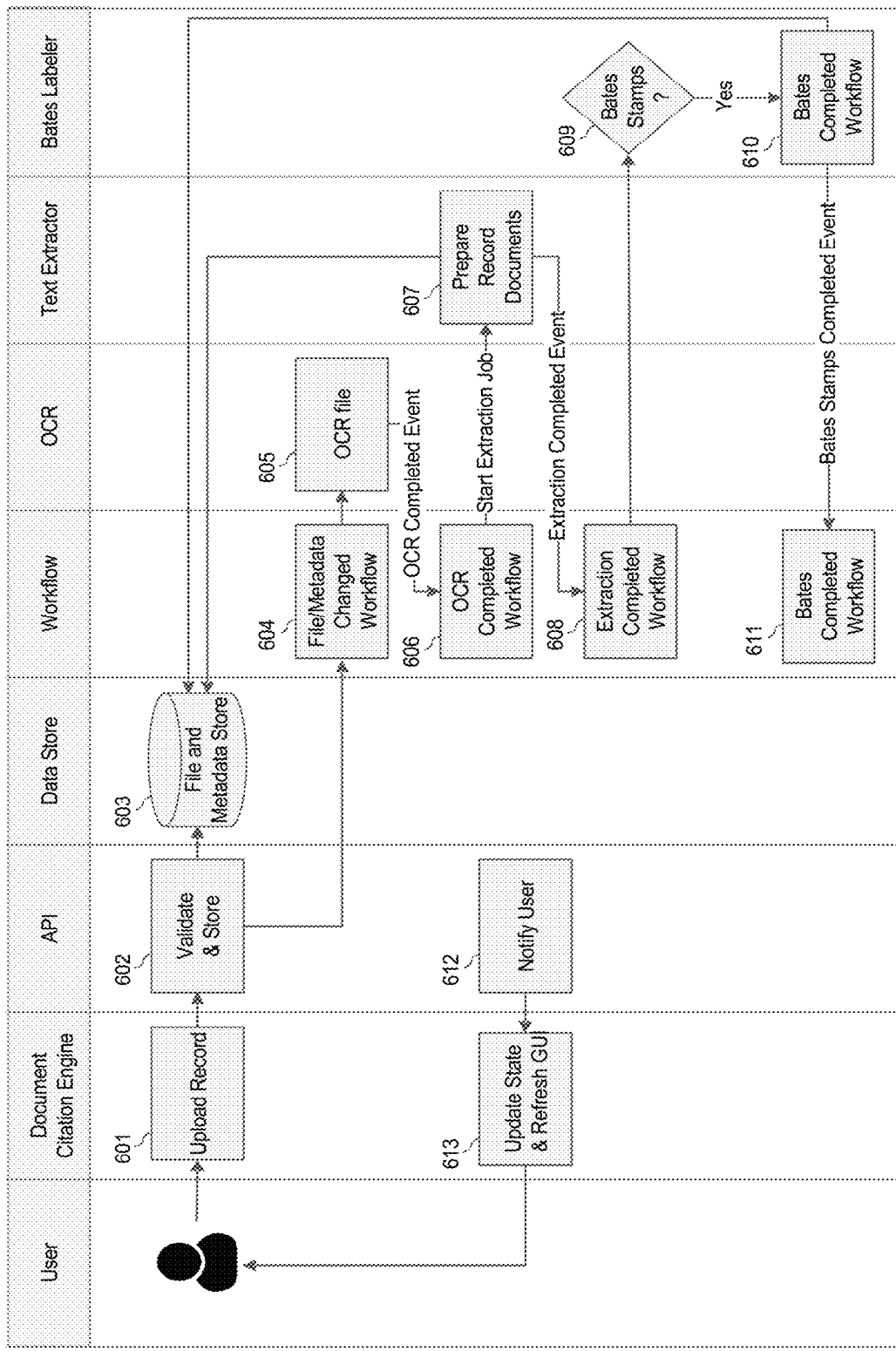
FIG. 6 is a sequence diagram for a method of tokenizing document citations according to some non-limiting embodiments or aspects.

Referring now to FIG. 6, a sequence diagram is shown for uploading and changing documents according to non-limiting embodiments. The depicted example illustrates a non-limiting embodiment in which the document citation engine is an add-in that interacts with a word processing application, such as Microsoft® Word. It will be appreciated that the document citation engine may also be a separate application, as described herein. Upon uploading a record document at step 601, a citation service (e.g., an API module) that facilitates communication between a word processing system, add-in for word processing system, the document citation engine, and/or other systems may perform a validation and storage step 602 of the record document. For example, the API module may facilitate communication between the client-side word processing add-in and a server-side application (e.g., a remote web service) that is part of the document citation engine. This validation and storage step may include authentication and authorization checks, validation of the record document data such as Bates numbering, storage of the PDF file(s) and associated metadata, and the creation of a record document change event indicating that a record document (e.g., one or more PDF files) has changed, as examples. As used herein, the term "event" may be used to describe an output or result of a process, such as a state, a message, a notification, and/or the like. In non-limiting examples, an event may refer to an SSE (Server-Sent Event).

With continued reference to FIG. 6, upon completion of the validation and storage step 602, the record document and associated metadata may be stored at step 603 in a document database by a data storage module. Upon receipt of the record document change event, a workflow process management module may automatically initiate one or more processing workflows as described herein. The workflow process management module may include software configured to initiate a first file/metadata change processing workflow at step 604 upon receiving the record document change event. The file/metadata change processing workflow 604 may start an Optical Character Recognition (OCR) process 605 in the OCR module. The OCR module may include software configured to perform an OCR process 605 such as Tesseract (open-source OCR engine) or the like. The OCR process 605 may perform an OCR when a new or modified document (without text or with low-quality text) is added to the record document. Upon completion of the OCR process 605, the OCR-processed text may be stored along with the corresponding document file (e.g., a PDF or the like) by the data storage module in the document database, and an OCR completed event may be created. The workflow process management module may automatically initiate an OCR completed workflow 606 upon receiving the OCR completed event. The OCR completed workflow 606 may start an extraction process 607 in the text processing module to prepare the text corresponding to the document files (e.g., PDF files or the like) for further analysis. The extraction process 607 may retrieve the text corresponding to the files, remove HTML tags, and/or perform other text cleaning operations. Upon completion of the extraction process 607, the extracted text may be stored in an analysis-ready JavaScript Object Notation (JSON) format or other structured format in the data storage module, and an extraction completed event may be created.

Still referring to FIG. 6, the workflow process management module may automatically initiate an extraction completed workflow 608 upon receiving the extraction completed event. The extraction completed workflow 608 may schedule to start a Bates stamping process 609 in the Bates Labeler module, which may include software configured to consecutively label a set of documents. Although "Bates" labels are discussed herein as an example, it will be appreciated that any convention or format of document labels may be used to consecutively paginate and label a set of documents. As part of the Bates stamping process 609, process checks may be performed to determine if the files (e.g., PDF documents or the like) should include Bates stamps (e.g., if a user specified that Bates labeling should occur and/or if the system automatically detects existing Bates labeling in related files). If Bates stamps are to be included, the process may assign Bates stamps 610 to each page of the document files in the Bates labeler module and may update the corresponding document files in the document database. A Bates completed workflow 611 may be automatically triggered by the reception of the Bates stamps completed event. Upon its completion, the workflow process management module may automatically initiate a notification to the application. In the API module, the server may send a notification 612 to the user application via SSE, as an example, or any communication protocol. The document citation engine (e.g., the add-in module) may then update its state and refresh its GUI 613.

Figure 7:
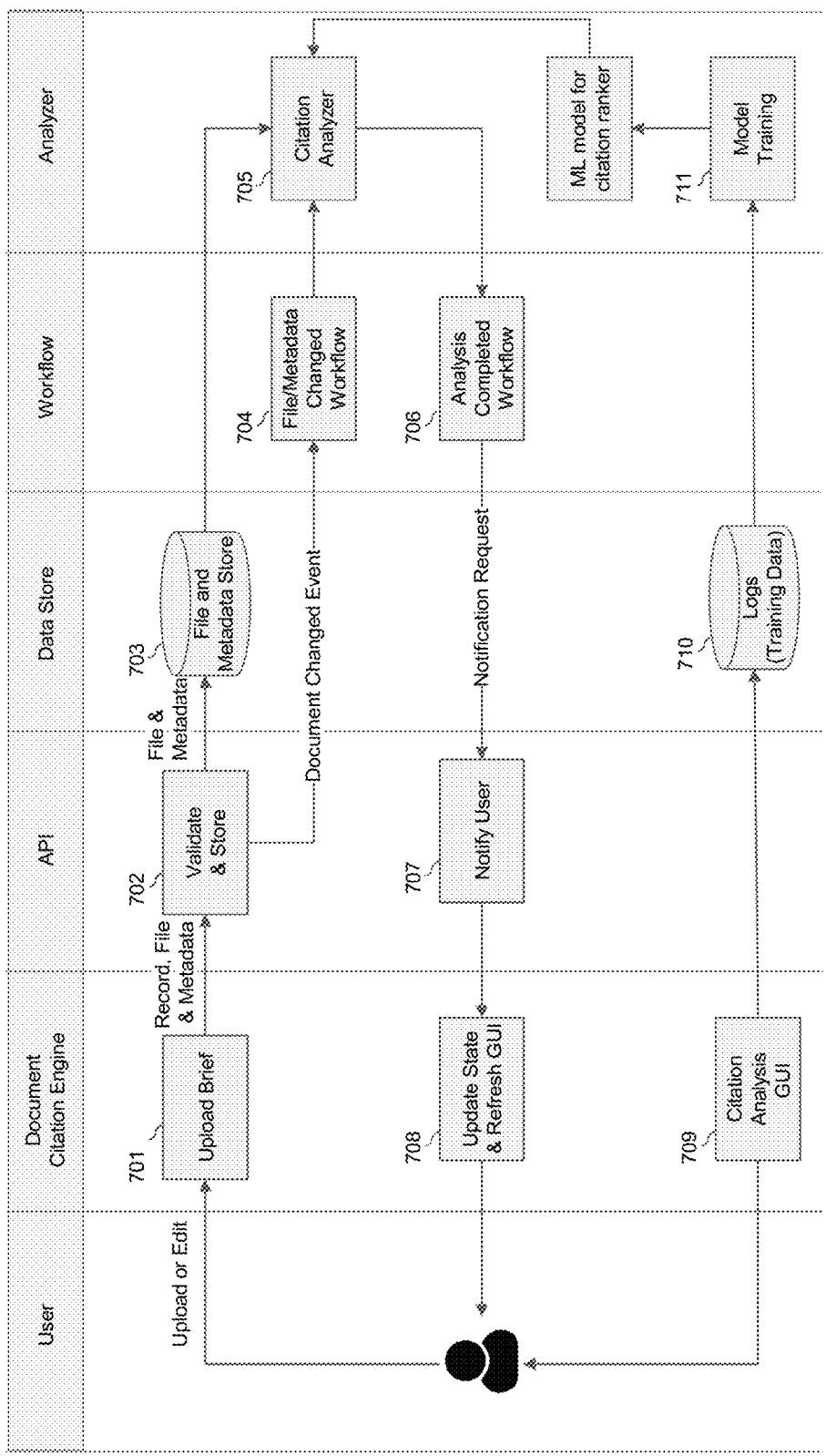
FIG. 7 is a sequence diagram for a method of tokenizing document citations according to some non-limiting embodiments or aspects.

Referring now to FIG. 7, a sequence diagram is shown for analyzing a textual document according to non-limiting embodiments. The depicted example illustrates a non-limiting embodiment in which the document citation engine is an add-in that interacts with a word processing application, such as Microsoft® Word. It will be appreciated that the document citation engine may also be a separate application, as described herein. The analyzer module may be part of the document citation engine or a separate system, and may include hardware and/or software configured to analyze the textual document. For example, in non-limiting embodiments, the analyzer module is a machine-learning software module that applies one or more machine-learning models to input data.

At step 701 a user may upload a textual document (e.g., a legal document such as a brief) and/or modify metadata associated with a textual document using a GUI of the document citation engine. A textual document may comprise one or more native word processing files, as an example, although various formats of textual documents may be used. Upon upload 701, the API module may automatically perform a validation and storage at step 702 of the record document. For example, the API module may interact with one or more other services. The validation and storage step 702 may include authentication and authorization checks, validation of the record document data (e.g., maximum size, checking software code, and/or the like), storage of the PDF file(s) and associated metadata in a document database, and creating a document change event indicating that the target textual document (e.g., the one or more word processing files to be analyzed) has changed. The metadata of the document may include, for example, metadata indicating paragraph boundaries of the document, metadata indicating footnotes of the document, and/or the other metadata described herein. Upon completion of the validation and storage step 702, the document files and associated metadata may be stored at step 703 by the data storage module in a document database or other data repository.

Upon the reception of the document change event, the workflow process management module may automatically initiate one or more processing workflows. For example, the workflow process management module may initiate a first file/metadata change processing workflow 704 upon receiving the document change event and/or a record document change event indicating that the target textual document and/or one or more record documents have changed. The file/metadata change processing workflow 704 may start an analyzer process 705 by the analyzer module. The analyzer may load the textual document and/or record files from the storage (e.g., in an analysis ready format) and may extract citations and assertions from the textual document. The analyzer may compute a relevancy score for each assertion/record paragraph and rank the results. The results may be stored by the data storage module in the document database or in a separate database for storing such document processing results. Upon completion of the analyzer process 705, an analysis completed event may be created.

The workflow process management module may automatically initiate an analysis completed workflow 706 upon receiving the analysis completed event. The analysis completed workflow 706 may start a notification request 707 in the API module to be sent to the document citation engine and/or word processing system. For example, the notification request 707 may send a notification to the document citation engine and/or word processing system via SSE, as an example. Upon sending the notification request 707, the document citation engine may update its state and refresh the GUI 708. The citation analysis user interface 709 may involve a user inputting one or more selections, accepting one or more suggested modifications, manually editing a suggested modification, and/or the like. Upon completion of the citation analysis user interface 709, the user selections may be stored in the feedback logs 710, as part of the training data, by the data storage module in the document database or other data repository. In non-limiting embodiments, a new training model 711 for ranking citations may be trained offline by the analyzer module, using user feedback data stored in the feedback logs 710. A machine-learning model for ranking citations 712 may be extracted from a training model in the analyzer module and can enrich the citation analyzer performing the analyzer process 705. The machine-learning model for ranking citations 712 is configured to rank a list of suggested page citations (e.g., such as pinpoint citations) in the source document(s) that may be used to replace or add to the citations the user has in the textual document. For example, the user may have cited "ER 25" and the model may determine that page 42 is also a good match because one or more sentences preceding the citation has a strong affinity with page 42. Thus, the pages for the citation may be ranked based on likelihood and/or confidence score.

Figure 8:
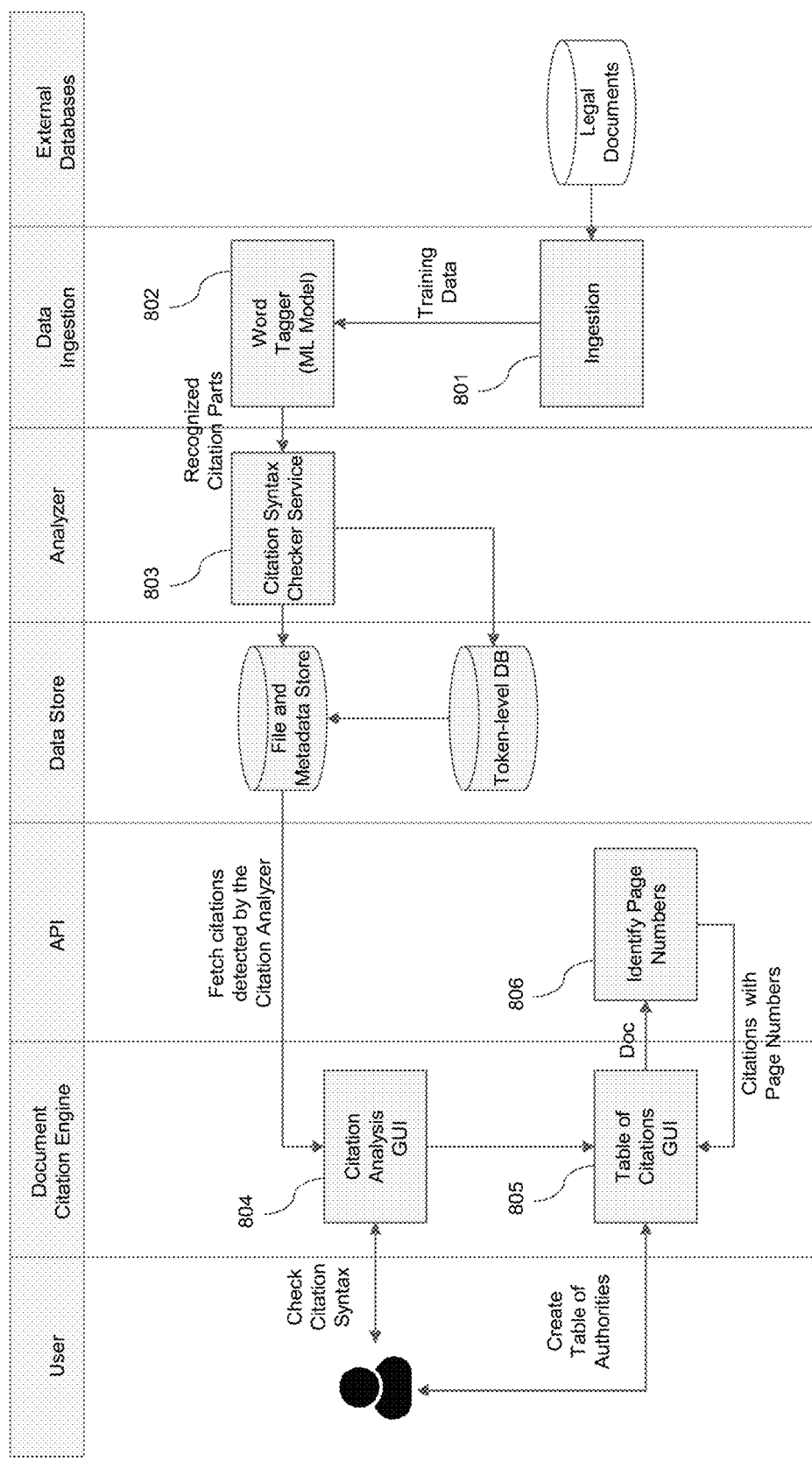
FIG. 8 is a sequence diagram for a method of tokenizing document citations according to some non-limiting embodiments or aspects.

Referring now to FIG. 8, a sequence diagram is shown for checking citation syntax according to non-limiting embodiments. The depicted example illustrates a non-limiting embodiment in which the document citation engine is an add-in that interacts with a word processing application, such as Microsoft® Word. It will be appreciated that the document citation engine may also be a separate application, as described herein. The data ingestion module may be part of the document citation engine or a separate system, and may include hardware and/or software configured to import to and obtain data from one or more other systems. External legal databases shown in FIG. 8 may include one or more external systems that are accessible via API requests or the like, such as organized collections of structured legal information stored electronically, such as the California State Statute repository, Google® Scholar, and/or a commercially-available legal database.

With continued reference to FIG. 8, in response to an ingestion step 801, the data ingestion module may process updates of a citation database stored by the data storage module. The citation database may include one or more entries for each type of citation component (e.g., citation token). Such entries may be stored in a token-level database specific to the textual document within a larger citation database (e.g., such as citation database 110 in FIG. 1) or may be stored as a document-specific citation database different than a global citation database that includes a citation dictionary of known citations (e.g., different than citation database 110 in FIG. 1). For example, the citation database may be a universal citation database that stores the citation and the Uniform Resource Locator (URL) to external and/or internal source documents. Instances of citations in the textual document get linked to this database to help identify citations with missing sources, add references to missing sources, and validate and/or resolve citations. The database includes known, existing citations (from public databases and/or other sources) and is expanded as the system discovers new citations in processed documents. Each citation token may be stored as it is parsed from the textual document. The token-level citation database may be used to train a Named Entity Recognition (NER) machine learning algorithm and/or to recognize citation components with lookup-based methods. The entries of the token-level citation database do not need to be whole citation components. For instance, "James" and "Sawyer" may be separate entries and used to recognize the string "James Sawyer" as a person or partial case caption by grouping two separate citation tokens together. The token-level citation database may be generated based on other portions of a citation database or a different citation database, such as a citation dictionary of all known citations with annotated (e.g., labeled) components. The citation dictionary does not need to be fully annotated. In some examples, a structured perceptron or a partial perceptron may be employed to improve the recall of a sequence model with no hand-annotated data by using lists of entities of each type of interest and a collection of unlabeled text.

In non-limiting embodiments, the citation database may be any form of searchable electronic repository. The citation database may include one or more entries generated for each known source and incorporate formatting variations according to different citation standards. For example, the citation database may include an SQL database or a document database to store tokenized documents (e.g., JSON or JSON-like documents). In some examples, the system may include two types of citation databases: one for publicly available sources (e.g., for citations to the law or legal documents) and one for documents that may be private to a user or user group (e.g., for citations to the case record). If a citation is not found in one of the available citation databases, a new citation may be automatically added to an appropriate citation database. For example, a citation that is not found may be automatically added to a private citation database in response to the user manually entering a citation that was not found. Alternatively, a citation formatting system may prompt the user to add the citation to the private citation database or to correct the citation in the textual document. If the added citation is a citation to the law, for example, a user and/or administrator may add the citation to the public citation database. Each citation database entry may include token groups including one or more citation tokens grouped together as a citation. The citation tokens may, in some examples, be linked to a token-level citation database for the specific textual document.

Citation categories may be identified with a natural language processing (e.g., non-rule-based) text processing algorithm to extract orthographical patterns. This may be based on the token-level citation database and/or the citation dictionary to compare portions of text (e.g., fragments, substrings, etc.) that are meant to refer to a citation and correspond to one or more citation tokens. Because the system parses citation tokens from unstructured textual documents, various heuristics may be employed to detect components of citations and save metadata related to such detected citation components. For instance, a search in the citation dictionary may be performed to recognize known citations. The search may be performed using a fuzzy search algorithm to retrieve known citations that may be misspelled or only partially indicated in the document text. The citation components may include entities (e.g. court name, party name, etc.) and/or values (e.g., page number, year, cardinality of citation in the textual document, etc.), each corresponding to a different citation token.

In non-limiting embodiments, the data ingestion module may recognize citation tokens at step 802 with a citation segment tagger algorithm. The citation segment tagger algorithm may apply a citation segment tagger machine learning model, as an example. In some examples, the data ingestion module may provide training data to a citation segment tagger machine learning model. The citation segment tagger machine learning model may be executable by a document citation engine and configured to recognize parts of citations (e.g., citation segments that are formed into citation tokens) while parsing a document. As part of the data set imported by the data ingestion module, the data ingestion module may further process known valid values for reporters, volumes, and page ranges, as examples of different citation parameters represented by specific citation tokens. The data ingestion module may identify citations as groups of citation tokens. The data ingestion module may also label each citation token in the group of tokens, such as reporter, volume, pages, paragraph numbers, plaintiff, defendant, and/or the like. A Name Entity Recognition (NER) algorithm may be used for improving the parsing of citations. For instance, the unstructured text "*Arizona* v. *James Sawyer*" could be replaced by structured text with labels and clear bounds as follows: "*Arizona* [LOCATION]" v. "*James Sawyer* [PERSON]." The recognized entities are thus clearly defined as "Arizona" and "James Sawyer." The labels in brackets represent each entity type and are associated with those entities. Other labels may also be employed, such as ORGANIZATION, PERSON, LOCATION, and/or the like.

A metadata tag may be associated with a citation (e.g., a related database entry) to convey the cardinality of the citation. The metadata tag may be saved along with the citation in the textual document (e.g., in editing mode) and/or in any published document (e.g., in viewing mode). For example, the metadata tag may include a numerical value representing the cardinality of the citation. Additionally or alternatively, the metadata tag may include a source identifier (e.g. unique index) to determine the cardinality of the citation by a computation performed by a rendering software application (e.g., to display or print an output). With the analyzer module, a citation syntax checker may perform a citation syntax validation process. The citation syntax checker may use any of or a combination of the following: the citation segment tagger model to identify citation tokens, the token-level database to validate and find correct values, and the global citation database to recognize whole citations. The citation syntax validation process may include the following steps: (i) identify the different citation tokens (e.g., components) of a citation, (ii) verify all required components are present, and (iii) verify that each component has a valid value (e.g., page number range, year, court name, and/or the like). Then, at step 803, the citation syntax checker may add one or more alternatives to the user-provided and parsed citations to the results stored in the token-level database or other citation database. The list of detected citations and alternative citations identified by the syntax checker can be obtained and displayed by a user interface module 804. Depending on the error type, some of the citations in the textual document may be automatically corrected.

Once the user initiates the process 805 for building the table of authorities in the GUI, the document (e.g., with numbered pages) may be sent to the API module to be processed by the document citation engine. For each page in the document, the citation service (e.g., API module) may identify the citations and build a list of citations and page number pairs 806. Eventually, the full list may be returned to the word processing system and add-in module for final assembly of a table (e.g., a table of authorities).

Figure 9:
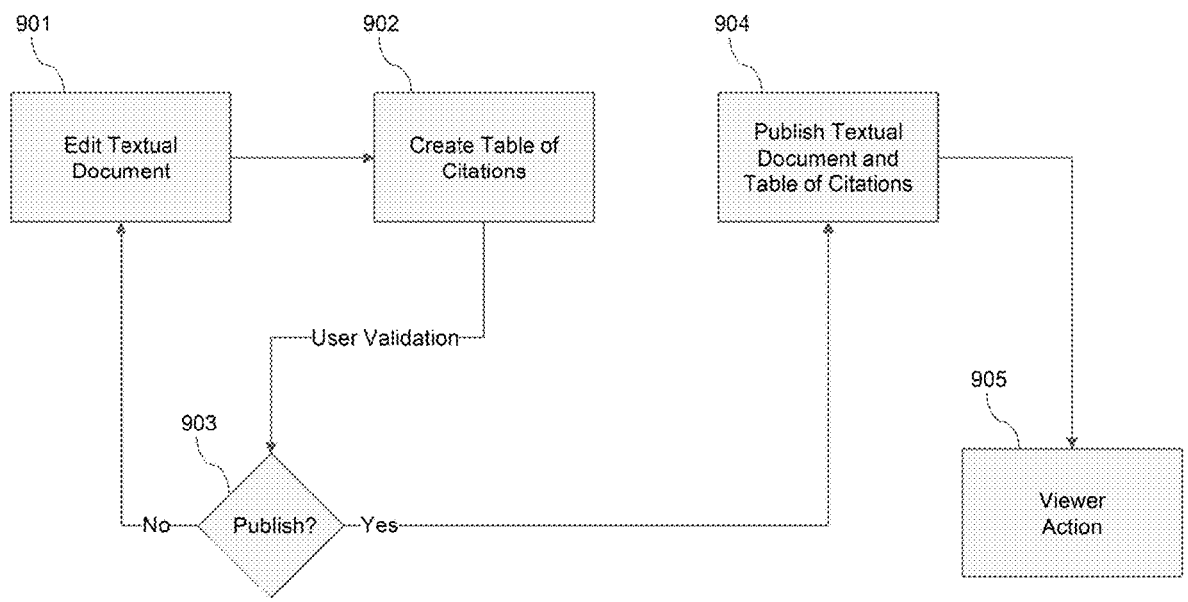
FIG. 9 is a sequence diagram for a method of tokenizing document citations according to some non-limiting embodiments or aspects.

Referring now to FIG. 9, a sequence diagram is shown for generating a table of citations according to a non-limiting embodiment. The depicted example illustrates a non-limiting embodiment in which the document citation engine is an add-in that interacts with a word processing application, such as Microsoft® Word. It will be appreciated that the document citation engine may also be a separate application, as described herein. During a first document editing phase 901, a user may create or edit a textual document without worrying about citation correctness or syntax errors. During the document editing phase 901, the user may add/change records using, for instance, the record upload/change process described herein. During the document editing phase 901, the textual document may remain in free text format without citation field codes. Thus, the user who creates the document (document author or editor) does not need to worry about the correctness or the formatting of the citations. The citations may remain in free text form during the editing phase 901.

In non-limiting embodiments, if and when the user decides to create a table of citations (e.g., a table of authority or a table of excerpts), the user may initiate a table of citation creation phase 902 via a selectable option. During the table of citation creation phase 902, the user may initiate an analyzer module of a document citation engine to analyze the textual document. For example, the user may choose a selectable option to analyze the citations while and/or before creating the table of citations. During the table of citation creation phase 902, the system may automatically, or the user may select to, create a table of authorities, a table of excerpt, and/or any kind of table of citations based on the free text citation data contained in the textual document. In non-limiting embodiments, the table of citation creation phase 902 may include: (i) the identification of only the relevant citations (e.g. of a particular citation type matching the desired table of citation type) and (ii) the determination of the page numbers on which each relevant citation appears. The table of citation creation phase 902 may also include: (iii) sorting citations in the table of authorities based on the first page number where each source is first cited, and/or (iv) linking each citation with a corresponding source document resource (e.g., a file stored remotely and linked by a URL or a URI).

In non-limiting embodiments, upon completion of the table of citations creation phase 902, the user may review the table of authorities and make any manual corrections during a validation phase 903. During the validation phase, a table of citations may be presented to the user on a GUI adjacent and/or along with a preview of the automated corrections made within the textual document. The user may validate the draft textual document and move to a publication phase 904, or return to the editing phase 901 to make corrections and/or edits. During the editing phase 901, the user may opt to finalize the document in a text editor application and upload the document to a remote database. Additionally or alternatively, the user may directly edit the document in a web-browser interface.

In non-limiting embodiments, upon validation by the user of the changes/corrections (or upon user satisfaction of the table of citations), a final version of the document may be published in the publication phase 904. The final version may be in any viewable format to be viewed by the user at step 905. If the final version is for offline viewing, it may be published as a non-editable PDF, TIFF, or other non-editable format, as examples. If the final version is for online viewing, it may be published in HTML or other marked-up language, as an example. The publication may be restricted to specific users or a group of users at step 905. For example, the final version of the document may be exported to a user's account on a remote server (e.g., a cloud-based software account) (also referred to as a "judge view"). Regardless of whether the final version of the document is published online or offline, a software service may associate each legal citation in the table of authorities with the related data referring to and displaying its source document.

In non-limiting embodiments, the document citation engine (e.g., a citation auditing subsystem thereof) may determine what category of citation each citation is in, and then whether it should be added to a legal table of authorities, a table of contents, or a table of excerpt. The citation category may be determined from metadata associated with a previous determination or may be determined by the citation auditing subsystem with one or more classification algorithms. The citation auditing system of the document citation engine may present a selectable window on the side of the main GUI of the word processing application to allow the user to visually verify the citations in a table of authorities and then display the pages on which each citation appears in the final version. Various other arrangements of displaying this information and receiving user input may be used. In this manner, human review of and oversight over the table of authorities is facilitated following automatic creation of the table of authorities in the word processing system. The user's feedback may be used to train one or more models.

In non-limiting embodiments, the citation auditing system may parse and analyze information from the textual document in the word processing system that indicates which pages of which documents (e.g., record documents) the user has cited to in the document, and then generates an excerpt (e.g., a combined set of documents such as a PDF or the like) that orders the cited documents in the order specified by the user (for example, in the order of smallest to largest Bates numbers or in the order in which the user cited to a particular record in the textual document being edited).

Figure 10:
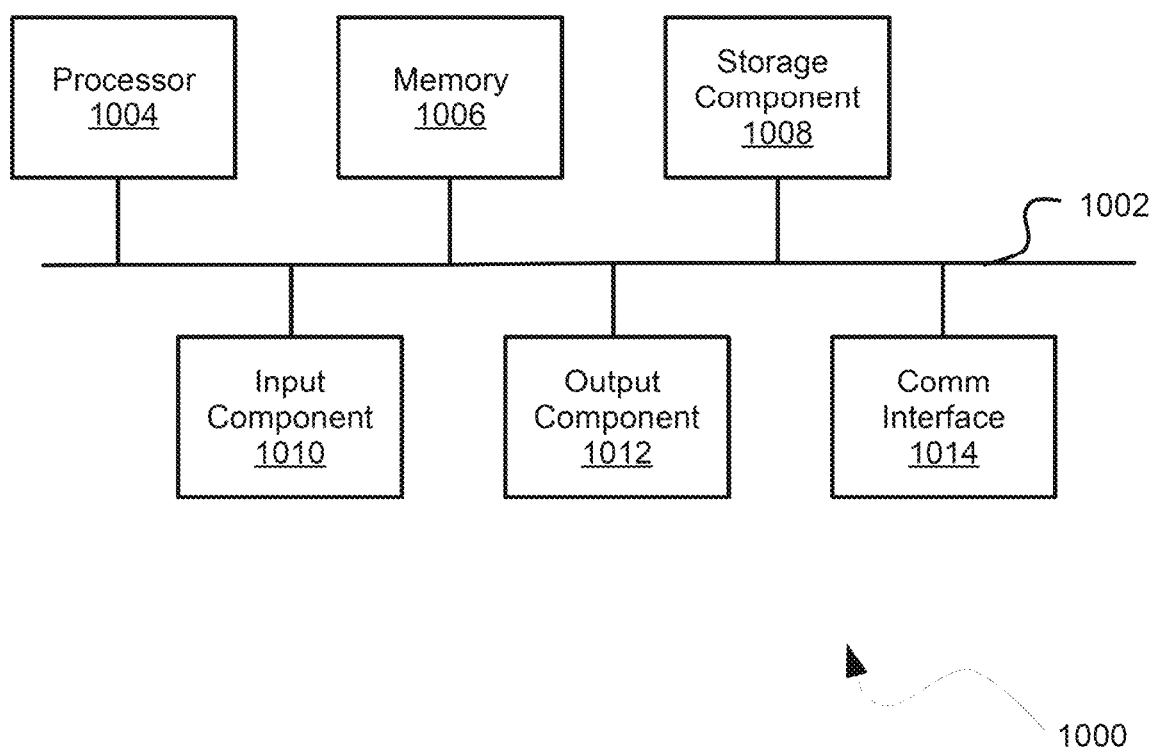
FIG. 10 illustrates example components of a device used in connection with non-limiting embodiments or aspects.

Referring now to FIG. 10, shown is a diagram of example components of a device 1000 according to non-limiting embodiments or aspects. Device 1000 may correspond to the document citation engine 101 and/or computing device 107 in FIG. 1, as an example. In some non-limiting embodiments or aspects, such systems or devices may include at least one device 1000 and/or at least one component of device 1000. The number and arrangement of components shown are provided as an example. In some non-limiting embodiments or aspects, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

As shown in FIG. 10, device 1000 may include a bus 1002, a processor 1004, memory 1006, a storage component 1008, an input component 1010, an output component 1012, and a communication interface 1014. Bus 1002 may include a component that permits communication among the components of device 1000. In some non-limiting embodiments or aspects, processor 1004 may be implemented in hardware, firmware, or a combination of hardware and software. For example, processor 1004 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 1006 may include random access memory (RAM), read only memory (ROM), and/or another type of dynamic or static storage device (e.g., flash memory, magnetic memory, optical memory, etc.) that stores information and/or instructions for use by processor 1004.

With continued reference to FIG. 10, storage component 1008 may store information and/or software related to the operation and use of device 1000. For example, storage component 1008 may include a hard disk (e.g., a magnetic disk, an optical disk, a magneto-optic disk, a solid state disk, etc.) and/or another type of computer-readable medium. Input component 1010 may include a component that permits device 1000 to receive information, such as via user input (e.g., a touch screen display, a keyboard, a keypad, a mouse, a button, a switch, a microphone, etc.). Additionally, or alternatively, input component 1010 may include a sensor for sensing information (e.g., a global positioning system (GPS) component, an accelerometer, a gyroscope, an actuator, etc.). Output component 1012 may include a component that provides output information from device 1000 (e.g., a display, a speaker, one or more light-emitting diodes (LEDs), etc.). Communication interface 1014 may include a transceiver-like component (e.g., a transceiver, a separate receiver and transmitter, etc.) that enables device 1000 to communicate with other devices, such as via a wired connection, a wireless connection, or a combination of wired and wireless connections. Communication interface 1014 may permit device 1000 to receive information from another device and/or provide information to another device. For example, communication interface 1014 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 1000 may perform one or more processes described herein. Device 1000 may perform these processes based on processor 1004 executing software instructions stored by a computer-readable medium, such as memory 1006 and/or storage component 1008. A computer-readable medium may include any non-transitory memory device. A memory device includes memory space located inside of a single physical storage device or memory space spread across multiple physical storage devices. Software instructions may be read into memory 1006 and/or storage component 1008 from another computer-readable medium or from another device via communication interface 1014. When executed, software instructions stored in memory 1006 and/or storage component 1008 may cause processor 1004 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

The invention claimed is:

1. A computer-implemented method for processing a textual document, comprising:

tokenizing, with at least one processor, each string of a plurality of strings in at least one textual document into at least one citation token representing at least one citation parameter, resulting in a plurality of citation tokens;

grouping, with the at least one processor, the plurality of citation tokens into a plurality of token groups, each token group of the plurality of token groups comprising at least one citation token, each token group representing a single, separate citation in the at least one textual document;

assigning, with the at least one processor, metadata to each token group of the plurality of token groups, the metadata comprising a cardinality of the citation represented by each token group based on a position of each token group in the at least one textual document relative to other token groups, the cardinality comprising an occurrence count of the citation;

generating, with the at least one processor, a normalized citation for each token group of the plurality of token groups based on the metadata and the at least one citation token of the token group; and generating, with the at least one processor, a document citation data structure based on the normalized citation for each token group of the plurality of token groups.

2. The computer-implemented method of claim 1, further comprising:

matching the normalized citation for each string of the plurality of strings to records of a citation database; and in response to determining that the normalized citation does not match the records of the citation database, adding the normalized citation to the citation database.

3. The computer-implemented method of claim 1, further comprising:

matching the normalized citation for each string of the plurality of strings to records of a citation database; and in response to determining that the normalized citation matches a record of the citation database, validating the normalized citation.

4. The computer-implemented method of claim 1, further comprising:

associating an external document to at least one normalized citation of the document citation data structure; and inserting a hyperlink to the external document into the at least one normalized citation.

5. The computer-implemented method of claim 1, further comprising:

receiving a plurality of external documents uploaded or linked by a user; and prompting the user to input document data for each external document of the plurality of external documents.

6. The computer-implemented method of claim 1, further comprising:

determining a citation category for each normalized citation from a plurality of citation categories; and generating a plurality of tables of citations based on the document citation data structure, a format of the at least one textual document, and the citation category for each normalized citation.

7. The computer-implemented method of claim 6, wherein the plurality of tables of citations comprises a table of authorities and a table of exhibits.

8. The computer-implemented method of claim 1, further comprising determining the cardinality for each string of the plurality of strings based at least on a position of the string in a sequence of the plurality of strings and a number of preceding matching citations.

9. The computer-implemented method of claim 1, further comprising:

generating a table of citations based on the document citation data structure and a format of the at least one textual document.

10. The computer-implemented method of claim 1, further comprising determining the cardinality of the citation represented by each token group based on at least one of the following: a preceding citation represented by a different token group, a following citation represented by a different token group, or any combination thereof.

11. The computer-implemented method of claim 1, further comprising generating at least one of the following based on the document citation data structure:

a table of authorities, a set of reference documents or portions thereof, an index, an exhibit compilation, a table of contents, a word processing native file, or any combination thereof.

12. The computer-implemented method of claim 1, further comprising, before tokenizing, parsing, with at least one processor, the at least one textual document to identify the plurality of strings based on a citation segment tagger algorithm, each string of the plurality of strings representing at least a portion of a citation.

13. A system comprising:

at least one processor programmed or configured to:

tokenize each string of a plurality of strings in at least one textual document into at least one citation token representing at least one citation parameter, resulting in a plurality of citation tokens;

group the plurality of citation tokens into a plurality of token groups, each token group of the plurality of token groups comprising at least one citation token, each token group representing a single, separate citation in the at least one textual document;

assign metadata to each token group of the plurality of token groups, the metadata comprising a cardinality of the citation represented by each token group based on a position of each token group in the at least one textual document relative to other token groups, the cardinality comprising an occurrence count of the citation;

generate a normalized citation for each token group of the plurality of token groups based on the metadata and the at least one citation token of the token group; and generate a document citation data structure based on the normalized citation for each token group of the plurality of token groups.

14. The system of claim 13, the at least one processor further programmed or configured to:

match the normalized citation for each string of the plurality of strings to records of a citation database;

in response to determining that the normalized citation does not match the records of the citation database, add the normalized citation to the citation database; and in response to determining that the normalized citation matches a record of the citation database, validate the normalized citation.

15. The system of claim 13, the at least one processor further programmed or configured to:

associate an external document to at least one normalized citation of the document citation data structure; and insert a hyperlink to the external document into the at least one normalized citation.

16. The system of claim 13, the at least one processor further programmed or configured to:

determine a citation category for each normalized citation from a plurality of citation categories; and generate a plurality of tables of citations based on the document citation data structure, a format of the at least one textual document, and the citation category for each normalized citation.

17. The system of claim 13, the at least one processor further programmed or configured to:

generate a table of citations based on the document citation data structure and a format of the at least one textual document.

18. The system of claim 13, the at least one processor further programmed or configured to generate at least one of the following based on the document citation data structure: a table of authorities, a set of reference documents or portions thereof, an index, an exhibit compilation, a table of contents, a word processing native file, or any combination thereof.

19. The system of claim 13, the at least one processor further programmed or configured to, before tokenzing, parse the at least one textual document to identify the plurality of strings based on a citation segment tagger algorithm, each string of the plurality of strings representing at least a portion of a citation.

20. A computer program product comprising at least one non-transitory computer-readable medium including program instructions that, when executed by at least one processor, cause the at least one processor to:

tokenize each string of a plurality of strings in at least one textual document into at least one citation token representing at least one citation parameter, resulting in a plurality of citation tokens;

group the plurality of citation tokens into a plurality of token groups, each token group of the plurality of token groups comprising at least one citation token, each token group representing a single, separate citation in the at least one textual document;

assign metadata to each token group of the plurality of token groups, the metadata comprising a cardinality of the citation represented by each token group based on a position of each token group in the at least one textual document relative to other token groups, the cardinality comprising an occurrence count of the citation;

generate a normalized citation for each token group of the plurality of token groups based on the metadata and the at least one citation token of the token group; and generate a document citation data structure based on the normalized citation for each token group of the plurality of token groups.

\* \* \* \* \*

UNITED STATES PATENT AND TRADEMARK OFFICE
CERTIFICATE OF CORRECTION

| | |
|---|---|
| PATENT NO. | : 11,461,407 B1 |
| APPLICATION NO. | : 17/575834 |
| DATED | : October 4, 2022 |
| INVENTOR(S) | : Jacqueline Grace Schafer et al. |

It is certified that error appears in the above-identified patent and that said Letters Patent is hereby corrected as shown below:

On the Title Page

Column 2, Item (56) Other Publications, Line 2, delete "Sumposium" and insert -- Symposium --

In the Claims

Column 28, Line 9, Claim 12, delete "tokenzing," and insert -- tokenizing, --

Column 29, Line 7, Claim 19, delete "tokenzing," and insert -- tokenizing, --

Signed and Sealed this
Twentieth Day of December, 2022

Katherine Kelly Vidal
*Director of the United States Patent and Trademark Office*